United States Patent
von Rhein

(10) Patent No.: US 9,594,157 B2
(45) Date of Patent: Mar. 14, 2017

(54) DEVICE WITH A VOLTAGE-CONTROLLED OSCILLATOR AND A CIRCUIT ARRANGEMENT FOR CONTROLLING THE OSCILLATOR

(71) Applicant: HELLA KGaA, Lippstadt (DE)

(72) Inventor: Andreas von Rhein, Salzkotten (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 337 days.

(21) Appl. No.: 13/745,276

(22) Filed: Jan. 18, 2013

(65) Prior Publication Data

US 2013/0194131 A1    Aug. 1, 2013

(30) Foreign Application Priority Data

Jan. 19, 2012 (DE) ................ 10 2012 100 427

(51) Int. Cl.
| | |
|---|---|
| *G01S 13/93* | (2006.01) |
| *G01S 13/00* | (2006.01) |
| *G01S 7/35* | (2006.01) |
| *G01S 7/40* | (2006.01) |

(52) U.S. Cl.
CPC ............... *G01S 13/00* (2013.01); *G01S 7/35* (2013.01); *G01S 7/4008* (2013.01)

(58) Field of Classification Search
CPC ..... H03L 2207/06; G01S 13/931; G01S 7/35; G01S 13/00
USPC ...................... 342/70, 175, 357.75
See application file for complete search history.

(56) References Cited

U.S. PATENT DOCUMENTS

| | | | | |
|---|---|---|---|---|
| 4,810,974 A | * | 3/1989 | Hulbert | ................ H03L 7/189 331/1 A |
| 5,867,536 A | * | 2/1999 | Lyons | ................ G01S 13/931 332/126 |
| 7,019,598 B2 | * | 3/2006 | Duncan | ............... H01F 17/0006 257/E27.046 |
| 7,310,022 B2 | * | 12/2007 | Doi | ........................ H03L 7/085 331/34 |
| 8,044,845 B2 | * | 10/2011 | Saunders | ................ G01S 7/032 342/175 |
| 2005/0102337 A1 | * | 5/2005 | Sullivan | .................. G06F 1/022 708/271 |
| 2005/0175357 A1 | * | 8/2005 | Kawanishi | ........... H04B 1/7174 398/187 |

(Continued)

*Primary Examiner* — Marcus Windrich
(74) *Attorney, Agent, or Firm* — Husch Blackwell LLP

(57) ABSTRACT

The present invention relates to a radar sensor. The radar sensor includes a voltage-controlled oscillator for generating a high-frequency signal with an actual frequency. The radar sensor also includes a circuit arrangement to control the oscillator, more specifically for adjusting a voltage to control the oscillator, with each value of a target frequency being allocated to a voltage value of the voltage intended to control the oscillator. The circuit arrangement to control the oscillator includes a signal generator with at least two signals that can be generated by the signal generator. The two signals may be two digital signals, two pulse-width modulated signals, or one digital and one pulse-width modulated signal. The signal generator also may include a first output, at which a digital signal can be provided or two digital signals can be provided and/or a second output at which a pulse-width modulated signal can be provided.

17 Claims, 2 Drawing Sheets

(56) References Cited

U.S. PATENT DOCUMENTS

| | | | | |
|---|---|---|---|---|
| 2005/0232385 A1* | 10/2005 | Yoshikawa | .......... | H03C 3/0925 375/376 |
| 2005/0275442 A1* | 12/2005 | Honda | ............. | H03K 3/356113 327/291 |
| 2009/0039967 A1* | 2/2009 | Schechinger | ........... | H03L 7/099 331/10 |
| 2011/0133794 A1* | 6/2011 | Dunworth | ................. | H03L 7/08 327/156 |

* cited by examiner

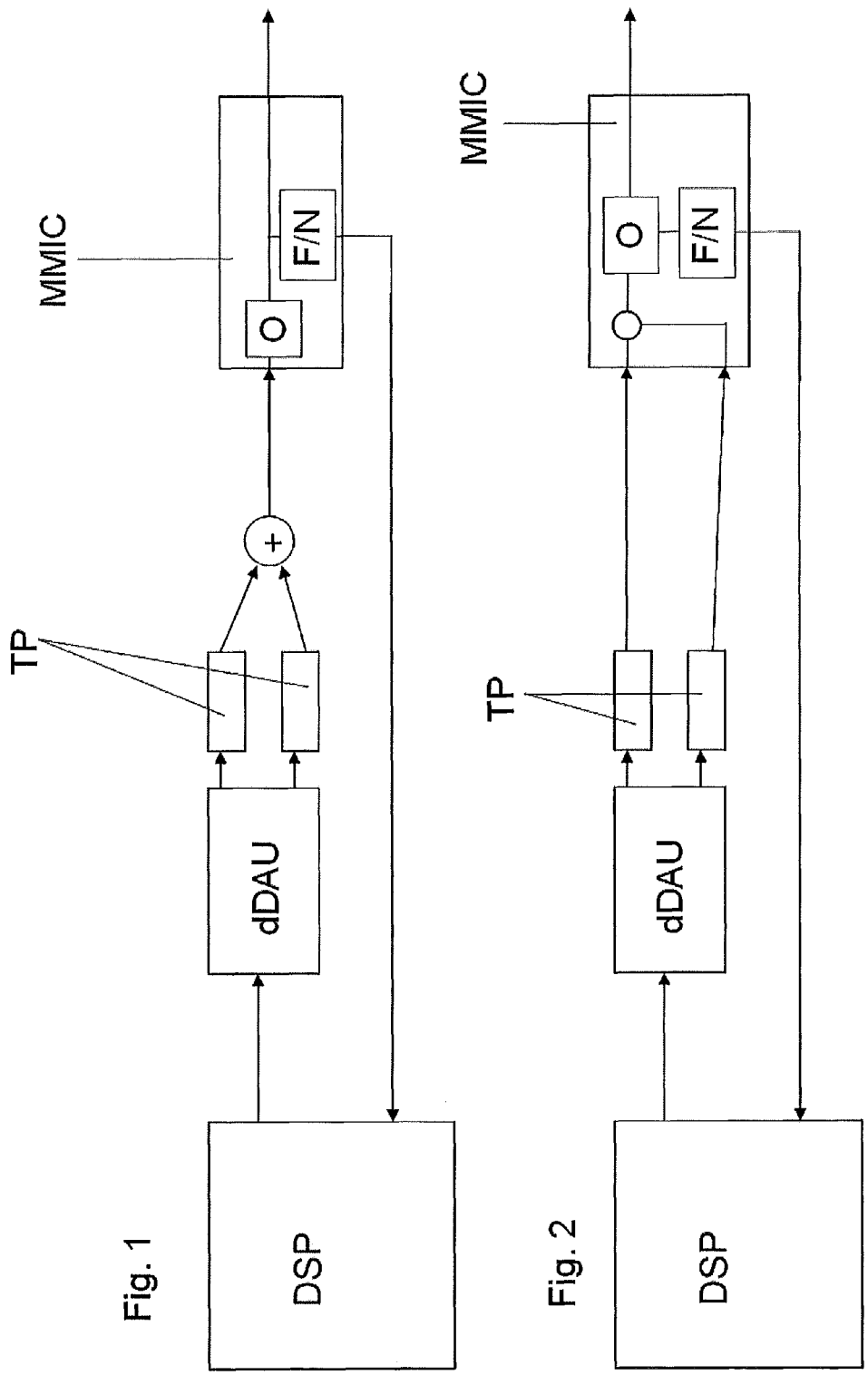

DEVICE WITH A VOLTAGE-CONTROLLED OSCILLATOR AND A CIRCUIT ARRANGEMENT FOR CONTROLLING THE OSCILLATOR

CROSS REFERENCE

This application claims priority to German Patent Application No. 10 2012 100 427.7, filed Jan. 19, 2012, which is expressly incorporated in its entirety by reference herein.

TECHNICAL FIELD OF THE INVENTION

The invention relates to a device, particularly a radar sensor, e.g. for a motor vehicle,
- with a voltage-controlled oscillator to generate a high-frequency signal with an actual frequency, —
- with a circuit arrangement for controlling the oscillator, namely for adjusting a voltage to control the oscillator, with each value of a target frequency being allocated to a voltage value of a voltage provided to control the oscillator,
- with the circuit arrangement comprising a signal generator to control the oscillator.

BACKGROUND OF THE INVENTION

Motor vehicles are today increasingly equipped with radar systems, in order to detect the distance of objects from the motor vehicle and the relative speed of said objects in reference to the motor vehicle. The detected distances and relative speeds may be used in various drive-assistance systems. Such drive-assistance systems may represent for ex-ample automatic light-width controls, automatic selections of light distribution, an automatic adjustment of the vertical or horizontal light-dark boundary, brake assistance, or the like. In such radar systems the device mentioned at the outset may be used comprising a voltage-controlled oscillator.

The European patent publication with the publication number EP 1 325 350 B1 discloses a method and a device for determining the distance and relative speed of an object distanced from the motor vehicle. The patent publication suggests a FMFSK-method (frequency modulated frequency shift keying). The device used in this method comprises a voltage-controlled oscillator, by which several signals to be transmitted are generated. Each signal has several sections with different frequencies, which are constant during the (individual) section, though. The sections are transmitted consecutively, with the frequency of the signal sections of a signal being increased from one section to the next. The sections of a signal are not transmitted directly after each other, though. Rather, each section of one signal is followed by a section of another signal. The alternation between the signal sections occurs here always in the same sequence and is repeated in each clock. This way, boxed signal sections are yielded. The frequency is always kept constant during a signal section.

From the disclosure with the publishing number DE 10 2009 048 112 A1 an alternative method is known, in which the frequency of a signal is not kept constant during a signal section, contrary to the method known from the patent publication EP 1 325 350 B1, but increases or drops linearly. A respective method is also known from the patent publication with the publishing number EP 0 312 601 B1.

In order to yield a result as good as possible in this method, only voltage-controlled oscillations can be used showing certain basic features, which particularly relate to incline, curvature, aging, and temperature drift of the voltage-controlled oscillator. When producing a device as described in these documents, here all voltage-controlled oscillators are measured prior to assembly and only suitable oscillators with the same features are selected.

Additionally, during operation regularly cycles are inserted into the ongoing operation in which the voltage-controlled oscillators are calibrated in order to compensate a temperature drift, for example. The calibration occurs via a phase control loop (also called phase-locked loop (PLL)). The phase-locked loop provided for calibration comprises a circuit arrangement to control the oscillator, namely to adjust the voltage in order to control the oscillator.

During the calibration cycles the devices cannot be used for generating radar signals to measure the distance and relative speeds. This is disadvantageous for the drive-assist systems in that the drive-assist systems cannot be provided with real-time data from the road during said period. This problem has already been discussed in the German patent application of Hella KGaA Hueck & Co. with the reference character DE 10 2010 061 041 dated Dec. 6, 2010.

The application DE 10 2010 061 041 discloses that the circuit arrangement comprises a digital signal processor for controlling the oscillator, which determines a value and provides it digitally at an output and that the digitally provided value at the outlet of the signal processor is converted via a digital-analog converter into an analog voltage signal, which is fed to a voltage-controlled oscillator. It is not described in the application how the signal is structured at the input or output, particularly what progression the signal shows at the input or output of the oscillator or how the input signals are generated.

SUMMARY OF THE INVENTION

The invention is based on the objective to improve a device of the type mentioned at the outset such that via an easily embodied circuit arrangement the control of the voltage-controlled oscillator is possible to generate an output signal, as disclosed in the publication DE 10 2009 048 112.

This objective is attained according to the invention such that by the signal generator at least two signals can be generated, namely two digital signals, two pulse-width modulated signals, or one digital and one pulse-width modulated signal, and that the signal generator comprises at least one output, at which a digital signal can be provided or two digital signals can be provided and/or comprises at least one second output, at which a pulse-width modulated signal can be provided.

The signal generator may therefore show a first output, at which two digital signals are provided. Additionally it may show two first outputs, at which one digital signal each can be provided. Additionally it is possible that the signal generator also shows a first output for a digital signal and a second output for a pulse-width modulated signal. Additionally the signal generator may comprise two second outputs for one pulse-width modulated signal each.

If at the first output of the signal generator two digital signals can be tapped, the circuit arrangement may show a dual digital-analog converter, which shows an input connected to the first output of the signal generator. The dual digital-analog converter may show two outputs, with an analog signal can be provided at each output, which can be converted by the dual digital-analog converter from one of the two digital signals applied at the dual digital analog signals. The two outputs of the dual digital-analog converter may be connected to inputs of the combination element. Preferably one of the two outputs or both of the two outputs are connected via low pass filters to the inputs of the combination element. By the filtering it is possible to smooth the analog signal or signals at the outputs of the dual digital-analog converter. The smoothing may be required, because the analog signal or analog signals at the output of the dual digital-analog converter are not free from jumps, depending on resolution. However, the signals shall be free from jumps, though, to the extent possible. Only intended jumps, also occurring in one of the digital signals, shall be discernible in the analog signals as well. The smoothing via a low pass filter or another suitable filter can suppress undesired jumps.

In the event a digital signal can be tapped at least at a first output of the signal generator the circuit arrangement may comprise a digital-analog converter, which shows an input connected to a first output of the signal generator. Additionally, the circuit arrangement may show two digital-analog converter, with their inputs being connected to the first out-puts of the signal generator. At least one digital-analog converter may show an output. An analog signal may be provided at the output of the digital-analog converter, which is converted from the digital signal applied at the input of the digital-analog converter. If a second digital-analog converter is provided an analog signal may also be provided here, which is generated from the digital signal applied at the input of the second digital-analog converter. The output of at least one digital-analog converter may be connected, if applicable with a low pass filter interposed, to the input of a combination element. Using the low pass filter the output signal of the digital-analog converter and/or via the low pass filters the output signals of the digital-analog converters can be smoothed in order to suppress any undesired jumps in the analog signal.

If the signal generator comprises one or two second outputs, at which a pulse-width modulated signal can be provided, at least one second output, perhaps with at least one low pass filter interposed, may be connected to the input of the combination element. The pulse-width modulated signal may be smoothed by the low pass filter or the pulse-width modulated signals can be smoothed by the low pass filters, in order to smooth undesired jumps in the analog signal.

The analog or pulse-width modulated signals provided at the two inputs of the combination element can be combined in the combination element to form a control signal for the voltage-controlled oscillator.

The signal generator may represent a digital signal processor.

The combination element may represent a summing member, in which the two signals applied at the input can be added. The combination element may represent, together with the oscillator, a part of a MMIC (monolithic microwave integrated circuit). If the combination element is a part of the MMIC, it may be realized such that a diode, important for generating oscillations, is divided asymmetrically into two parts. The signals applied at the input of MMIC are connected to one of the parts of the diode each. By the asymmetrical distribution one voltage input is yielded, which reacts more sensitive to voltage fluctuations and one which reacts less sensitive to voltage fluctuations. The diode links the applied signals to generate the control signals for the oscillator of the MMIC.

If a summing member is used outside a MMIC, it may follow the behavior of the described diode of MMIC. This means, the rapid voltage modulation is weighed lower before or during addition than the slower signal to generate a relaxation oscillation or a sawtooth wave.

A device according to the invention may be operated as follows: Two signals can be generated by the signal generator, which if applicable are converted into an analog signal and which are combined in a combination element for the voltage-controlled oscillator. The voltage controlled oscillator may generate a high-frequency signal, which can be split into a periodic relaxation oscillation or a periodic delta oscillation with a first frequency and a periodic signal with two or more successive steps with a second frequency, with the second frequency being an integral multiple of the first frequency.

An ideal voltage-controlled oscillator shows a linear parameter, i.e. that the oscillator, for each increase of the potential at the input of the oscillator, is increased by a voltage independent from the strength of the potential at the input of the frequency of the output signal by the same amounts. If the high-frequency signal shall show a constantly rising frequency at the output of the oscillator a relaxation oscillation must be applied at the input of the ideal oscillator. In real voltage-controlled oscillators usually no linear parameter is given, though. Rather the parameter is curved. In order to obtain a signal with a constantly rising frequency at the output of a real oscillator the respective control signal must show a curved voltage progression at the input of the oscillator. This may be respectively generated by the signal generator of a device according to the invention.

The signal generator of a device according to the invention may be adjusted, particularly programmed such that a control signal is provided for the oscillator, which controls the oscillator to generate a high-frequency signal such that it can be split on the one hand in the period signal with two or more successive steps with the second frequency and on the other side into a sawtooth wave or a relaxation oscillations or into any arbitrary combination of sections of a sawtooth wave, a relaxation oscillation, and a direct-current signal.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate to the best presently known mode of can out the invention and wherein similar reference characters indicate the same parts throughout the views.

FIG. 1 a first device according to the invention with a dual digital-analog converter and a summing member as the combination element, FIG. 2 a second device according to the invention with a dual digital-analog converter and a combination element in a MMIC, FIG. 3 a third device according to the invention with a signal generator with outputs for a pulse-width modulated signal and a summing member as the combination element, and FIG. 4 a third device according to the invention with a signal generator with outputs for a pulse-width modulated signal and a combination element in a MMIC.

DETAILED DESCRIPTION

Figure 3:
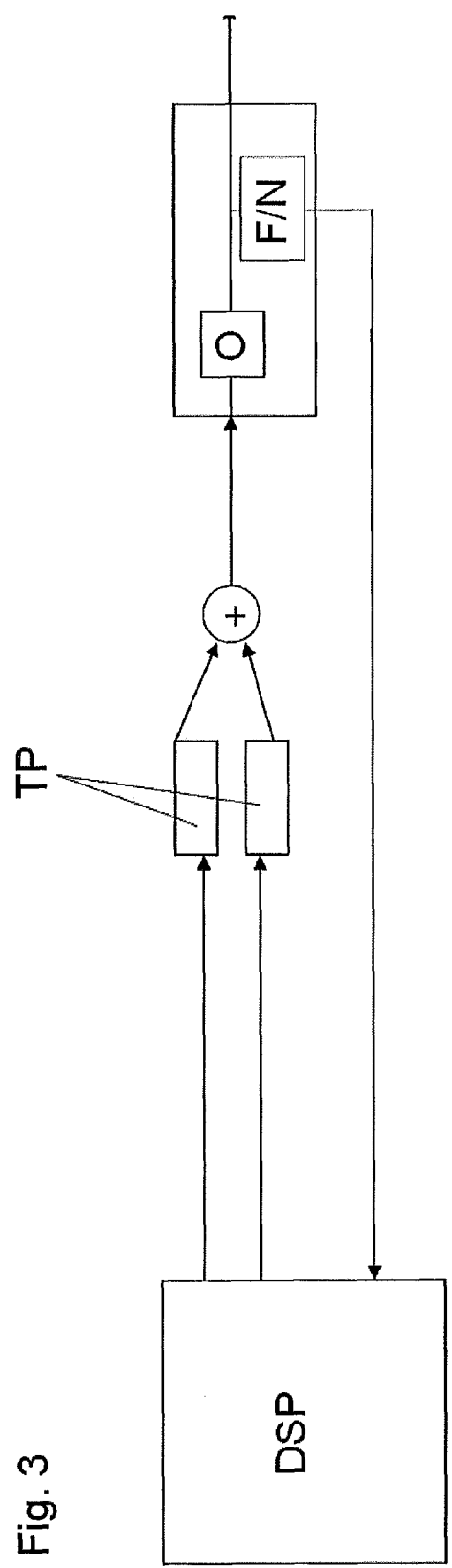

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

The devices according to the invention shown in FIGS. 1 through 4 show a signal generator which is formed by one digital signal processor DSP each. In the digital signal processors DSP signals are formed, which after further processing outside the digital signal processors DSP are used to control voltage-controlled oscillators O. The voltage-controlled oscillators O are parts of monolithic microwave circuits MMIC, with the high-frequency signal applied at its first outputs generated by the oscillators O according to the control. The monolithic microwave circuits MMIC comprise, in addition to the voltage-controlled oscillators O, frequency splitters N, which on the one side are connected to the oscillators O and on the other side to a second output of the monolithic microwave circuit MMIC. Via the frequency splitters N the frequency of the high-frequency signal is reduced and the signal is fed to the second output with a reduced frequency. The second outputs of the monolithic microwave circuits MMIC are connected to the input of the digital signal processors DSP. Via this connection it is possible to control the frequency of the signals at the outputs of the oscillators O and a calibration of the oscillators O. The design of such a regulation and/or calibration is described in the patent application 10 2010 061 041.0, the entire disclosure of which is incorporated herein by reference.

The device according to the invention shown in FIGS. 1 through 4 differ by the connections from the digital signal processors DSP to the monolithic microwave circuits MMIC. Additionally, depending on the example, different outputs are used at the digital signal processors DSP and different inputs in the monolithic microwave circuits MMIC.

The device according to the invention shown in FIG. 1 comprises a digital signal processor DSP, which shows a first output at which two digital signals may be applied. These digital signals may be fed to a dual digital-analog converter dDAU, with its input then being connected to a first output of the digital signal processor DSP. The dual digital-analog converter dDAU comprises two analog outputs which are fed via low pass filters to a summing member. Two analog signals are provided at the two analog outputs by the dual digital-analog converter dDAU, which are generated from the two digital signals applied at the input of the dual digital-analog converter dDAU. The signal applied to a first of the two outputs of the digital-analog converter dDAU describes a periodic relaxation oscillation, while the signal applied at the second of the two outputs of the digital-analog converter dDAU describes periodically successive steps, in which the frequency remains constant during a step, with the frequency being increased from step to step, though. The frequency of the analog signal at the second output of the dual digital-analog converter dDAU amounts to an integral multiple, for example 512-fold the frequency of the analog signal applied at the first output of the dual digital-analog converter dDAU.

In order to suppress the waviness characteristic for analog signals low pass filters TP are arranged downstream of the outputs, which are adjusted to the respective frequency of the analog signals.

The two analog signals are added by the summing member so that a signal is yielded, such as disclosed for example in the document DE 10 2009 048 112 A1, the entire disclosure of which is incorporated herein by reference.

The device according to the invention shown in FIG. 2 differs from the device according to the invention shown in FIG. 1 such that an interface inside the monolithic microwave circuit MMIC is used, instead of the summing member, in order to link the analog signals provided by dual digital-analog converters dDAU and filtered by the low pass filters. The two analog signals are fed to the monolithic microwave circuit MMIS via two inputs. A first input, namely the input the relaxation oscillation is applied, is used in other applications of the monolithic microwave circuits MMIC for a rough adjustment of the oscillator. A second input, namely the input at which the periodically successive steps are applied, is used in other applications of the monolithic microwave circuit MMIC for a fine adjustment of the oscillator.

The device according to the invention shown in FIG. 3 differs from the device according to FIG. 1 such that other outputs of the digital signal processor DSP are used, namely two outputs for pulse-width modulated signals. At the first of the two outputs of the digital signal processor DSP a pulse-width modulated signal is applied, which describes a relaxation oscillation. A pulse-width modulated signal is applied at the second of the two outputs of the digital signal processor DSP, which describes the periodically successive steps. Both signals show a waviness, which is suppressed by the subsequent filter TP. The outputs of the filters TP are combined at a summing member, with its output being connected to an input of the monolithic microwave circuit MMIC.

Figure 4:
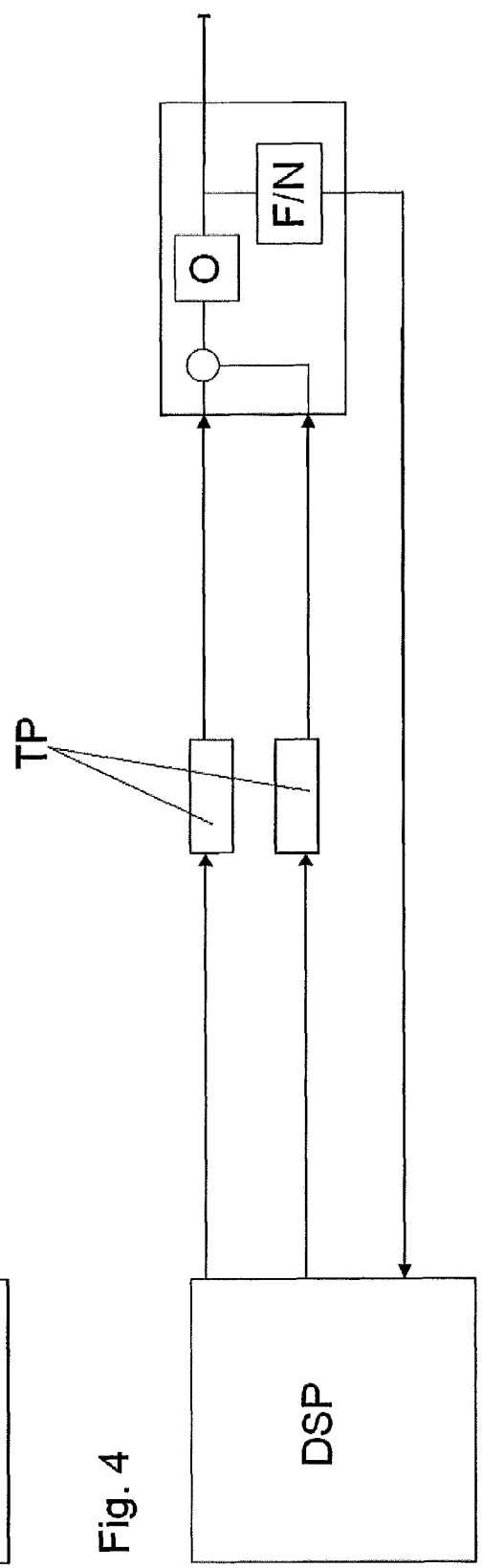

The device according to the invention shown in FIG. 4 differs from the device according to the invention shown in FIG. 3 such that, similar to the device according to FIG. 2, no summing member is used but the two signals are linked within the monolithic microwave circuit MMIC. For this purpose, similar to the device according to FIG. 2, an input is used for a rough adjustment of the oscillator and an input for the fine adjustment of the oscillator.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE CHARACTERS

O Oscillator
MMIC monolithic microwave circuit
DSP digital signal processor
dDAU dual digital-analog converter
TP low pass filter

The invention claimed is:

1. A radar sensor, said radar sensor comprising:
a voltage-controlled oscillator configured for generating a high-frequency signal with an actual frequency;
a circuit arrangement for adjusting a voltage to control the oscillator, with each value of a target frequency being allocated to a voltage value of the voltage intended to control the oscillator;
wherein the circuit arrangement for controlling the oscillator comprises a signal generator; wherein
the signal generator is configured to simultaneously generate at least one of: two pulse-width modulated signals and one digital and one pulse-width modulated signal; and
the signal generator further comprising at least a first output, said at least one of two pulse-width modulated signals and one digital and one pulse-width modulated signal being provided to one of said at least a first output.

2. The radar sensor according to claim 1, wherein at the first output of the signal generator the at least one of: two pulse-width modulated signals and one digital and one pulse-width modulated signal can be tapped and that a switching arrangement comprises a dual digital-analog converter, which shows an input connected to the first output of the signal generator.

3. The radar sensor according to claim 2, wherein the dual digital-analog converter shows two outputs, wherein at each output an analog signal can be provided, converted by the dual digital-analog converter from one of the two digital signals applied at the input of the digital-analog converter.

4. The radar sensor according to claim 3, wherein the two outputs of the dual digital-analog converter are connected to a combination element.

5. The radar sensor according to claim 1, wherein at least at the first output of the signal generator a digital signal can be tapped and that the circuit arrangement comprises at least one digital-analog converter, which has an input connected to at least the first output of the signal generator.

6. The radar sensor according to claim 5, wherein the at least one digital-analog converter comprises an output, with at the output of the digital-analog converter an analog signal can be provided, converted from the digital signal applied at the input of the digital-analog converter.

7. The radar sensor according to claim 5, wherein an output of the at least one digital-analog converter is connected to the input of a combination element.

8. The radar sensor according to claim 1, wherein at least one second output is connected to an input of a combination element.

9. The radar sensor according to claim 4, wherein the analog or pulse-width modulated signals provided at the inputs of the combination element are combined to a control signal for voltage-controlled oscillators.

10. A method for operating a radar sensor according to claim 9, wherein two signals are generated by the signal generator are combined in the combination element to form a control signal for the voltage-controlled oscillator, with one signal describing a periodic relaxation oscillation or a periodic triangular oscillation with a first frequency, the other signal describing periodically sequenced two or more subsequent steps of a second frequency, with the second frequency representing an integral multiple of the first frequency.

11. The radar sensor according to claim 1, further comprising a second output, at which a pulse-width modulated signal can be provided.

12. The radar sensor according to claim 4, further comprising an interposed low pass filter connecting the two outputs of the dual digital-analog converter to the combination element.

13. The radar sensor according to claim 7, further comprising an interposed low pass filter connecting the output of the at least one digital-analog converter to the input of the combination element.

14. The radar sensor according to claim 8, further comprising an interposed low pass filter connected the at least one second output to the input of the combination element.

15. The radar sensor according to claim 7, wherein the analog or pulse-width modulated signals provided at the inputs of the combination element are combined to a control signal for voltage-controlled oscillators.

16. The radar sensor according to claim 8, wherein the analog or pulse-width modulated signals provided at the inputs of the combination element are combined to a control signal for voltage-controlled oscillators.

17. The method for operating a radar sensor according to claim 10, wherein the two signals generated by the signal generator are converted into an analog signal before being combined in the combination element to form a control signal for the voltage-controlled oscillator.

* * * * *

UNITED STATES PATENT AND TRADEMARK OFFICE
CERTIFICATE OF CORRECTION

PATENT NO.        : 9,594,157 B2
APPLICATION NO.   : 13/745276
DATED             : March 14, 2017
INVENTOR(S)       : Andreas von Rhein Page 1 of 1

It is certified that error appears in the above-identified patent and that said Letters Patent is hereby corrected as shown below:

In the Specification

In Column 4, Line 52, delete "can" and replace with -- carrying --

Signed and Sealed this
Sixteenth Day of May, 2017

Michelle K. Lee
*Director of the United States Patent and Trademark Office*